(12) United States Patent
Ju

(10) Patent No.: US 7,264,758 B2
(45) Date of Patent: Sep. 4, 2007

(54) METHOD FOR PRODUCING AN ELECTRICAL CONNECTOR

(76) Inventor: Ted Ju, P.O. Box 26-757, Taipei 106 (TW)

( * ) Notice: Subject to any disclaimer, the term of this patent is extended or adjusted under 35 U.S.C. 154(b) by 0 days.

(21) Appl. No.: 11/052,576

(22) Filed: Feb. 8, 2005

(65) Prior Publication Data
US 2006/0175733 A1    Aug. 10, 2006

(51) Int. Cl.
*B29C 45/14* (2006.01)
(52) U.S. Cl. ................. 264/138; 264/255; 264/272.15; 264/275; 264/296
(58) Field of Classification Search ...................... None
See application file for complete search history.

(56) References Cited

U.S. PATENT DOCUMENTS

| | | | | |
|---|---|---|---|---|
| 3,207,832 A | * | 9/1965 | Patti et al. ..................... 29/841 |
| 3,330,004 A | * | 7/1967 | Cloyd et al. ................... 72/386 |
| 3,389,461 A | * | 6/1968 | Hardardt ....................... 29/848 |
| 3,438,122 A | * | 4/1969 | Woods, Jr. et al. ........... 29/596 |
| 4,135,297 A | * | 1/1979 | Guttenberger et al. ........ 29/604 |
| 4,231,628 A | * | 11/1980 | Hughes et al. .............. 439/676 |
| 4,337,574 A | * | 7/1982 | Hughes et al. ................ 29/883 |
| 4,497,756 A | * | 2/1985 | Bouchard et al. ............ 264/1.9 |
| 5,074,039 A | * | 12/1991 | Hillbish et al. ............... 29/883 |
| 5,299,729 A | * | 4/1994 | Matsushita et al. .... 228/180.22 |
| 6,048,482 A | * | 4/2000 | Lemke et al. ................ 264/251 |
| 6,503,436 B1 | * | 1/2003 | Koguchi et al. ............. 264/277 |

* cited by examiner

*Primary Examiner*—Edmund H. Lee
(74) *Attorney, Agent, or Firm*—Rosenberg, Klein & Lee

(57) ABSTRACT

An electrical connector and a method for producing the same are described. A metallic wire is provided. The metallic is folded into a predetermined shape by upper and lower formation devices. One of the formation devices is replaced by a mold, and an insulative material is poured into the mold to cover part of the metallic wire and form a contact end protruding out of the insulative material. Thus, the electrical connector has an insulative housing and a plurality of metallic wires partially disposed inside the insulative housing with a contact end protruding out of the insulative housing.

3 Claims, 5 Drawing Sheets

METHOD FOR PRODUCING AN ELECTRICAL CONNECTOR

BACKGROUND OF THE INVENTION

1. Field of the Invention

The present invention relates to an electrical connector and a method for producing the same.

2. Description of Related Art

The conventional electrical connector, used to connect two electrical components next to each other, includes an insulative housing and a plurality of contacts disposed therein. The contacts generally are punched from metallic materials. There are two methods for arranging the contacts in the insulative housing. In one method, the punched contacts are placed in a mold, the liquid insulative material is poured into the mold, and the mold is removed after the insulative housing is cooled and set. Thus, the contacts and the insulative housing of such a conventional electrical connector are made integrally in one piece. In the second method, the contacts are directly and mechanically inserted into the insulative housing.

However, steps in the conventional methods are complicated and expensive and the resulting electrical connector is difficult to miniaturize.

SUMMARY OF THE INVENTION

An electrical connector and a method for producing the same are provided for cheap and easy manufacturing.

An electrical connector according to the present invention comprises an insulative housing and a plurality of metallic wires having a part disposed inside the insulative housing and a contact end exposed out of the insulative housing.

A method for producing an electrical connector according to the present invention comprises the following steps. A metallic wire is provided. The metallic wire is folded into a predetermined shape by upper and lower formation devices. One of the formation devices is replaced by a mold, and an insulative material for covering part of the metallic wire is poured into the mold. A contact end exposed out of the insulative material is thus formed.

To provide a further understanding of the invention, the following detailed description illustrates embodiments and examples of the invention. Examples of the more important features of the invention have thus been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF PREFERRED EMBODIMENTS

Figure 1:
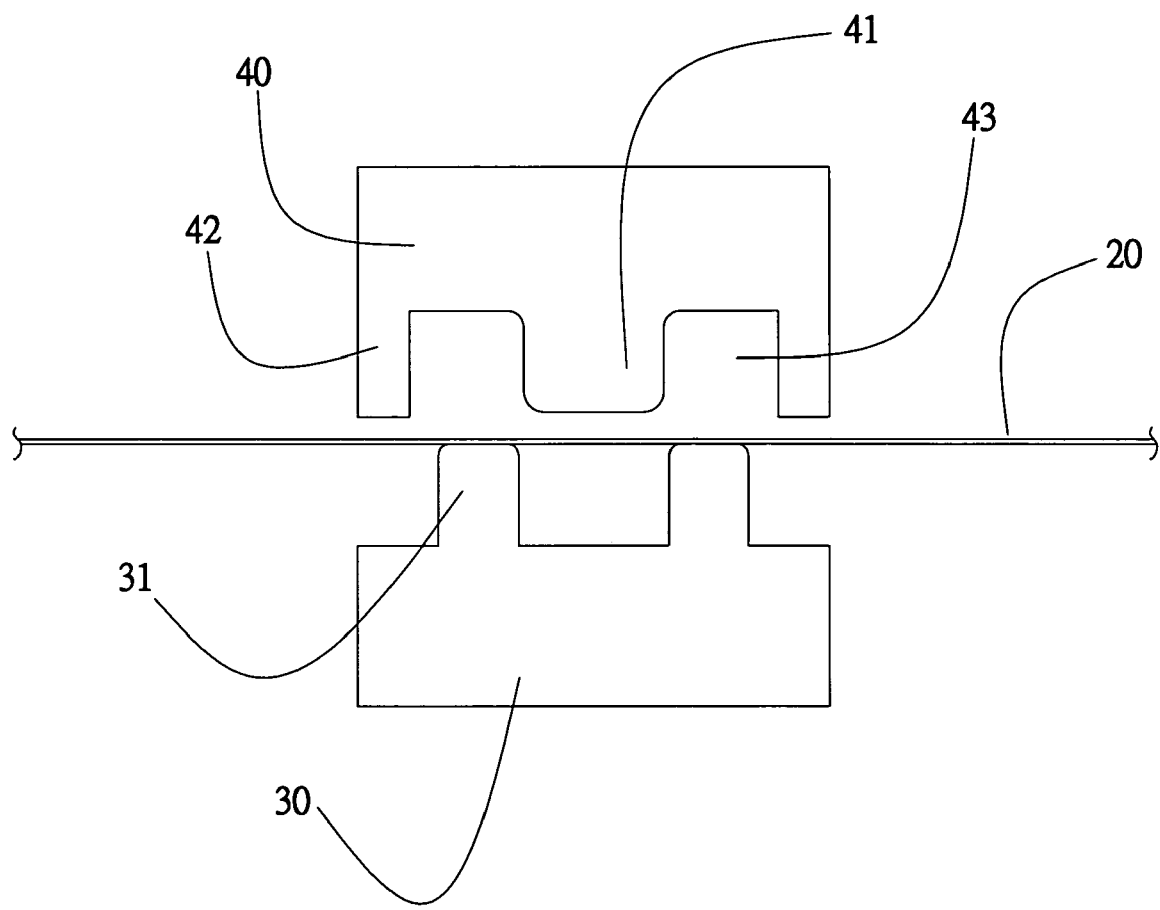
FIG. 1 is a decomposition view of an upper formation device, a lower formation device and a metallic wire according to the present invention.
Figure 2:
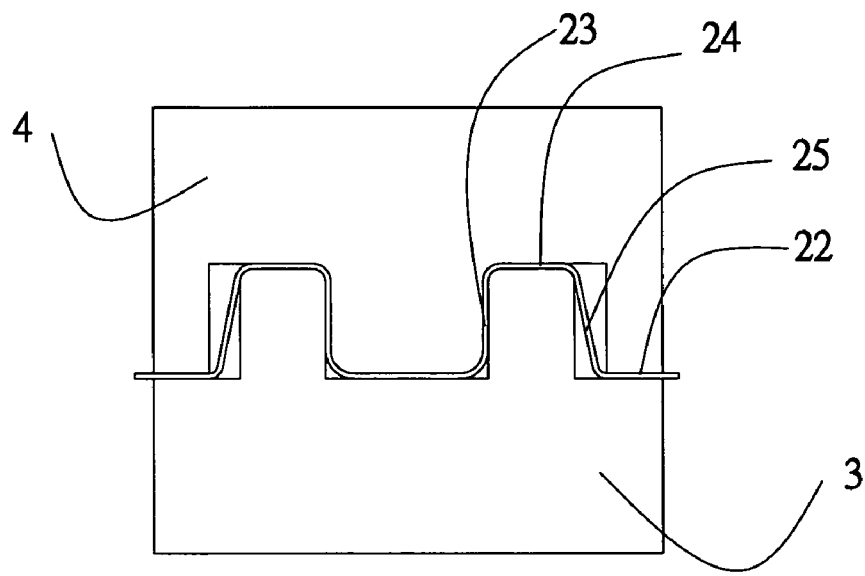
FIG. 2 is a perspective view according to FIG. 1.
Figure 3:
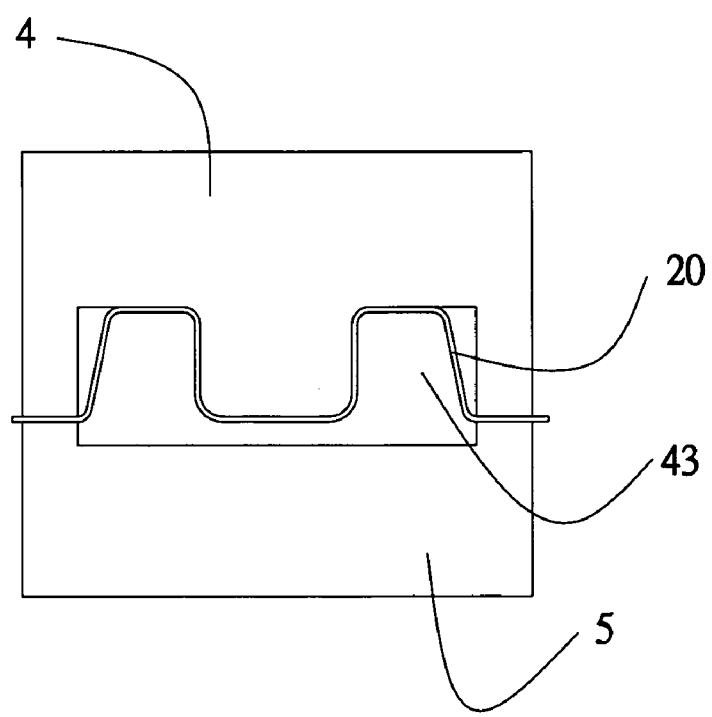
FIG. 3 is a perspective view of the upper formation device, a lower mold and the metallic wire according to the present invention.
Figure 4:
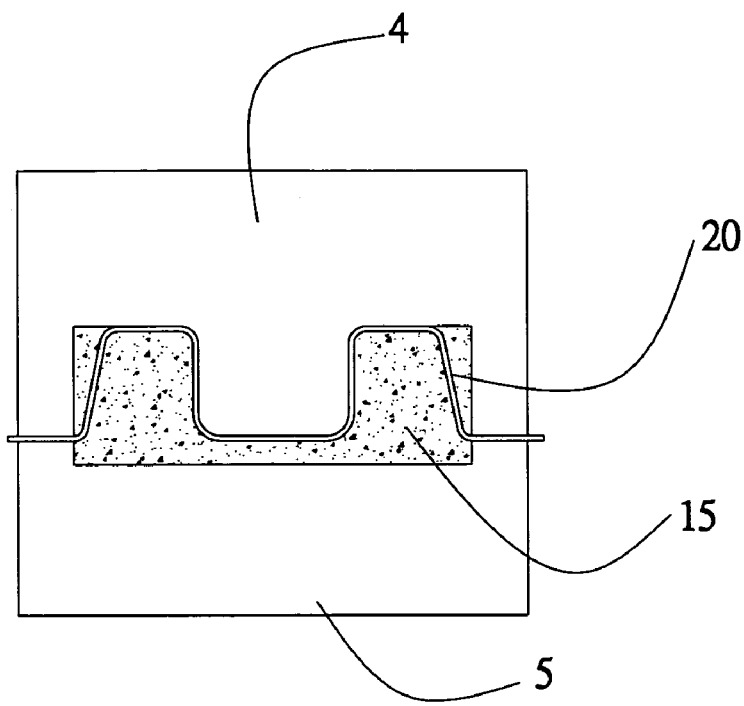
FIG. 4 is a perspective view of the upper formation device, a lower mold and the metallic wire after the liquid insulative material is poured inside according to the present invention.
Figure 5:
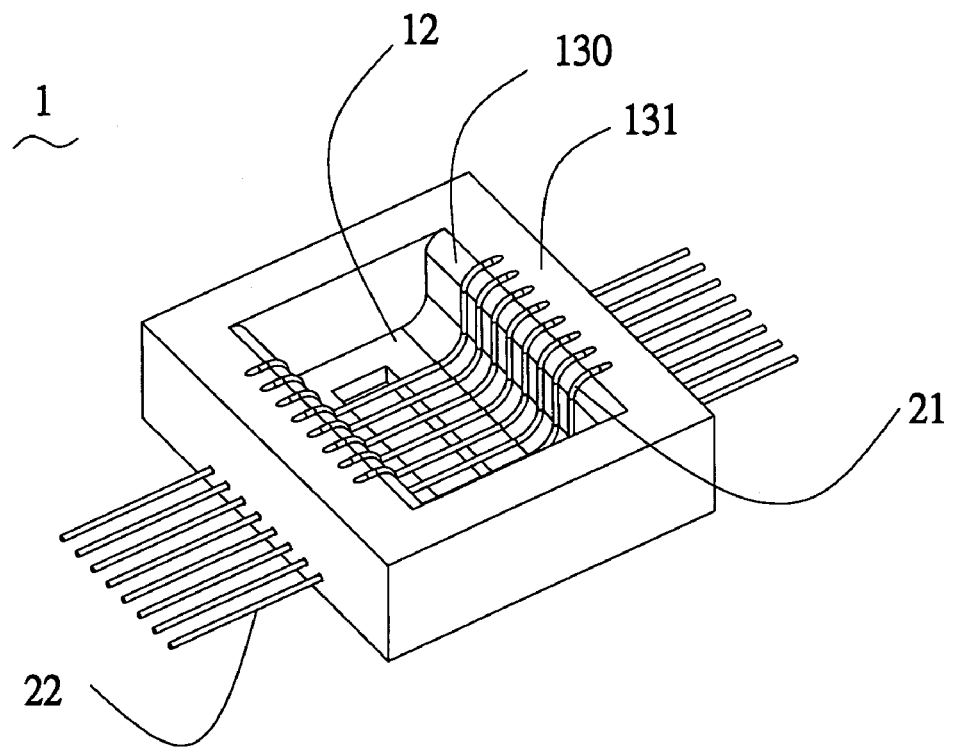
FIG. 5 is a perspective view of a first embodiment of an electrical connector according to the present invention.

With respects to FIGS. 1 to 5, an electrical connector 1 includes an insulative housing 10 and a plurality of metallic wires 20.

The insulative housing 10 has an opening 12 and a frame round 13 circumscribes the opening 12. The metallic wire 20 has a portion disposed inside the insulative housing 10, and a contact end 21 connected to the portion, located inside the frame round 13 and extending to a top 131 of the frame round 13. The contact end 21 protrudes out of the insulative housing 10 for electrically connecting the mating member. In addition, a solder end 22 of the metallic wire 20 connected to the portion also protrudes out of a lower part of the insulative housing 10.

A method for producing the electrical connector 1 includes providing a lower formation device 3. Lower formation device has a base 30, substantially rectangular, two protrusion portions 31 extending from a top surface of the base 30, and a predetermined distance formed between the two protrusion portions 31.

A metallic wire 20 can be disposed above the two protrusion portions 31 of the lower formation device 3. The metallic wire 20 can be a straight strip.

An upper formation device 4 includes a main portion 40, a projection 41 downwardly extending from a middle of the main portion 40, a side wall 42 downwardly extending from a perimeter of the main portion 40, and a reception slot 43 formed between the sidewall 42 and the projection 41. The upper formation device 4 can be placed over the lower formation device 3, the projection 41 is located between the two protrusion portions 31, and the sidewall 42 is over the base 30 of the lower formation device 3. The metallic wire 20 is shaped by pressing the upper and the lower formation devices 4, 3, and has a U-shaped portion 23, two horizontal portions 24 extending from two lateral sides of the U-shaped portion 23, two tilting portions 25 downwardly and slantwise extending from the two horizontal portions 24, and two solder portions 22 extending outwardly and horizontally from the two tilting portions 25 for electrically connecting to, for example, a printed circuit board. A lower mold 5 is used to replace with the lower formation device, and the shaped metallic wire 20 is disposed between the lower mold 5 and the upper formation device 4. Part of the metallic wire 20 is adjacent to the sidewall 42, and a closed cavity is formed when the lower mold 5 and the upper formation device 4 are combined together. A liquid insulative material 15 is poured into the closed cavity and cooled. The upper formation device 4 and the lower device 5 can then be removed, so as to make the electrical connector 1.

Figure 6:
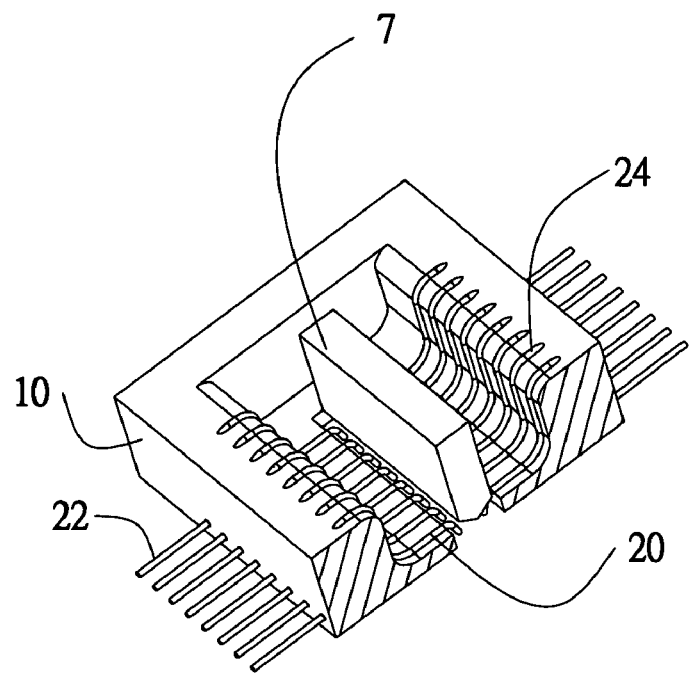
FIG. 6 is a perspective view of a seconded embodiment of the electrical connector with the cutting device according to the present invention.

In this embodiment, the metallic wire 20 arranged in the opening 12 of the insulative housing 10 can be broken by a cutting device 7. The cutting device 7 can be disposed in the opening 12 of the insulative housing 10, and a blade of the cutting device 7 is perpendicular to the two horizontal portions 24 for cutting the metallic wire 20 (in FIG. 6).

Figure 7:
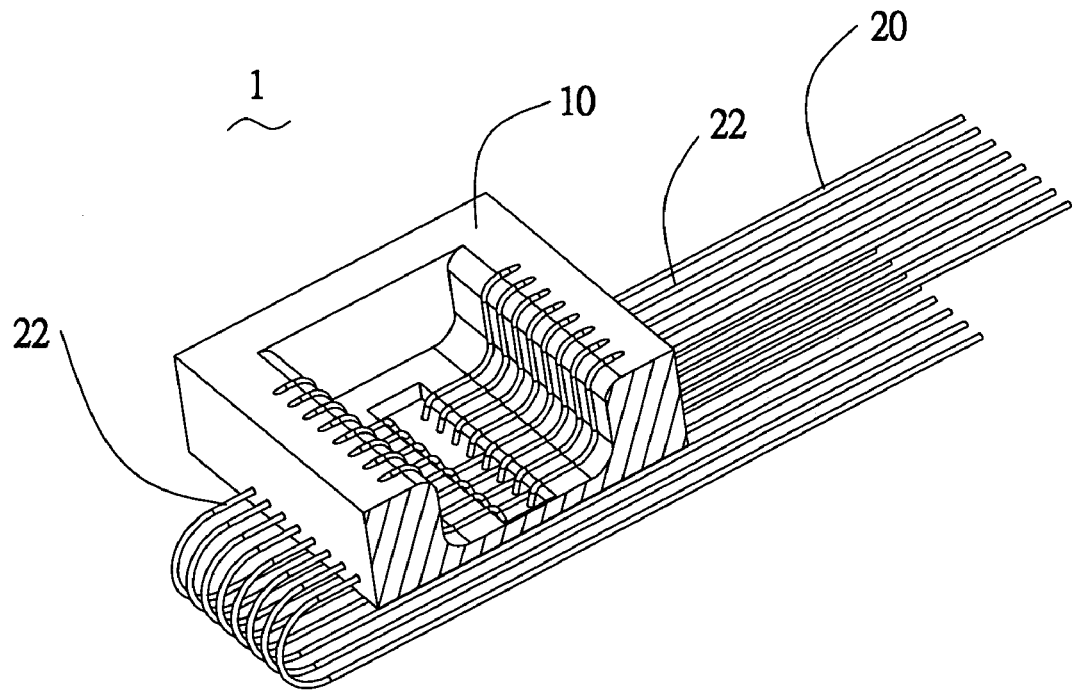
FIG. 7 is a perspective view of a third embodiment of the electrical connector according to the present invention.

Referring to FIG. 7, the metallic wire 20 has a part arranged at a respective side of the insulative housing 10 that can be bent inversely with a straight angle along a bottom surface of the insulative housing 10. Metallic wire 20 then can form a cord by combining with the other part of the metallic wire 20 arranged at the other side of the insulative housing 10 for electrically connecting to, for example, a power source.

Figure 8:
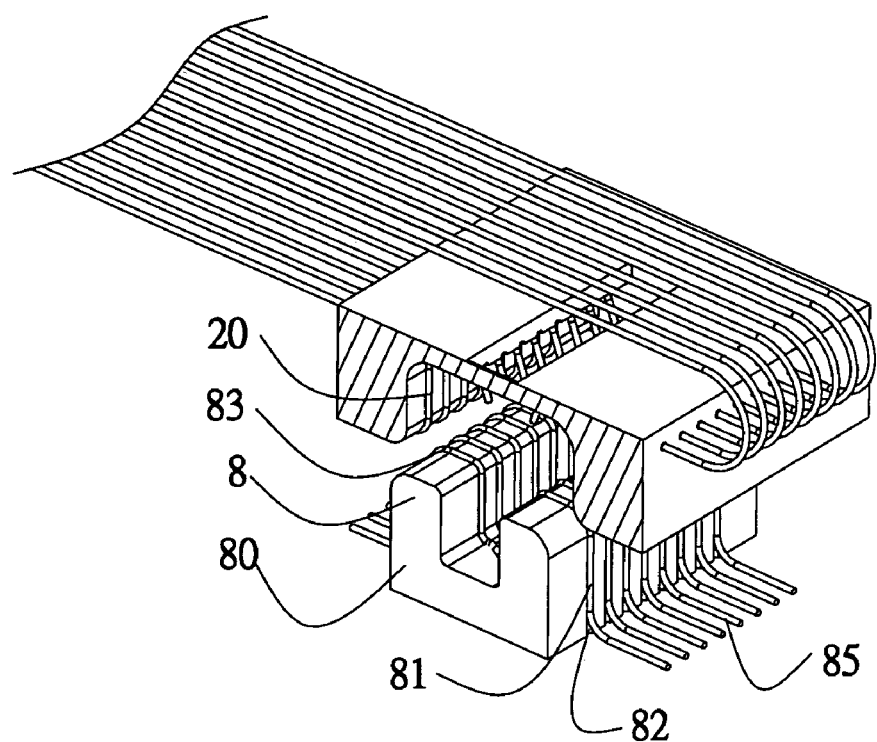
FIG. 8 is a decomposition view of the electrical connector corresponding with a mating connector according to FIG. 7.
Figure 9:
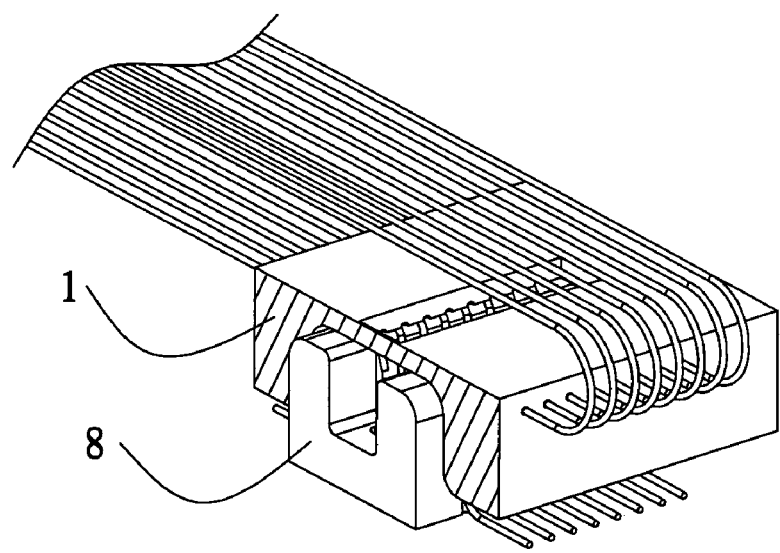
FIG. 9 is a perspective view of the electrical connector corresponding with a mating connector according to FIG. 7.

With respect to FIGS. 7 to 9, a mating connector 8 includes a mating insulative housing 80 and a plurality of metallic wires 81. The mating insulative housing 80 has a plurality of slots 82 formed therein and defined with a width less than that of the metallic wires 81. The metallic wires 81 are set into the slots 82 of the insulative housing 80 and further curved into a shape. Each of the metallic wires 81 has a contact portion 83 protruding out of a surface of the insulative housing 80, and a solder portion 85 formed horizontally at a remote end thereof. When the electrical connector 1 connects the mating connector 8, the mating insulative housing 80 of the insulative housing 80 can be received inside the opening 12 of the insulative housing 10 of the electrical connector 1. The metallic wire 81 of the mating connector 8 electrically connects with the metallic wires 20 of the electrical connector 1.

The cross-sectional configuration of the metallic wires can be round, flat or equilaterally polygonal. In addition, the metallic wire can be covered with a rubbery layer, or a conductive layer covered the rubbery layer for shielding, and further an isolative layer covered with the conductive layer.

It should be apparent to those skilled in the art that the above description is only illustrative of specific embodiments and examples of the invention. The invention should therefore cover various modifications and variations made to the herein-described structure and operation of the invention, provided they fall within the scope of the invention as defined in the following appended claims.

What is claimed is:

1. A method for producing an electrical connector, comprising:

folding a metallic wire into a predetermined shape by upper and lower formation devices;

removing one of the formation devices from the metallic wire;

replacing the removed one of the formation devices with a mold while retaining the metallic wire in the remaining one of the formation devices to form a cavity between the mold and the remaining formation device;

providing into the cavity between the remaining formation device and the mold an insulative material thereby covering part of the metallic wire with the insulative material, the insulative material forming an insulative housing having an opening formed therein, the metallic wire having a pair of contact ends protruding out of the insulative material, a portion spanning the opening and a pair of solder ends respectively extending from opposing sides of the insulative housing; and cutting through the portion of the metallic wire spanning the opening to form the metallic wire into two independent conductors, each conductor having a corresponding connector end and solder end.

2. The method as claimed in claim 1, further including the step of:

covering the metallic wire with an insulating material layer.

3. The method as claimed in claim 2, where the step of covering the metallic wire with an insulating material layer is followed by the steps of covering the insulating material layer with a conductive layer for shielding, and covering the conductive layer with another insulating material layer.

* * * * *